United States Patent [19]

Winter et al.

[11] Patent Number: 5,194,073
[45] Date of Patent: Mar. 16, 1993

[54] SINTERED COMPOSITE ABRASIVE MATERIALS, A PROCESS FOR ITS PRODUCTION AND ITS USE

[75] Inventors: Gerhard Winter, Vienenburg; Paul Möltgen, Laufenburg; Dietmar Fister, Murg, all of Fed. Rep. of Germany

[73] Assignee: Hermann C. Starck Berlin GmbH & Co. KG, Berlin, Fed. Rep. of Germany

[21] Appl. No.: 789,759

[22] Filed: Nov. 8, 1991

[30] Foreign Application Priority Data

Dec. 7, 1990 [DE] Fed. Rep. of Germany ....... 4039021
Jun. 11, 1991 [DE] Fed. Rep. of Germany ....... 4119183

[51] Int. Cl.$^5$ ................................. B24D 3/02
[52] U.S. Cl. .......................... 51/309; 51/293
[58] Field of Search .................... 51/293, 309

[56] References Cited

U.S. PATENT DOCUMENTS

| | | | |
|---|---|---|---|
| 5,009,676 | 4/1991 | Rue et al. | 51/293 |
| 5,035,724 | 7/1991 | Pukari et al. | 51/309 |
| 5,114,891 | 5/1992 | Kunz et al. | 51/309 |
| 5,123,935 | 4/1992 | Kanamaru et al. | 51/309 |
| 5,131,923 | 7/1992 | Markhoff-Matheny et al. | 51/293 |
| 5,139,539 | 8/1992 | Haynes, Jr. | 51/309 |
| 5,141,527 | 8/1992 | Winkler et al. | 51/293 |

FOREIGN PATENT DOCUMENTS

| | | |
|---|---|---|
| 0311289 | 4/1989 | European Pat. Off. |
| 0324513 | 7/1989 | European Pat. Off. |
| 0395087 | 10/1990 | European Pat. Off. |

*Primary Examiner*—William R. Dixon, Jr.
*Assistant Examiner*—Willie J. Thompson
*Attorney, Agent, or Firm*—Jerry Cohen; Harvey Kaye

[57] ABSTRACT

Sintered composite abrasive material useful in abrasives (grinding wheels, abrasive discs and paper, etc.) and cutting tools, comprising an α-Al$_2$O$_3$ matrix of submicron crystallite size made by sol-gel processing with a dispersed phase therein of mechanically resistant material, preferably essentially isotropic grains, added directly to the sol or gel stage of matrix formation.

11 Claims, No Drawings

SINTERED COMPOSITE ABRASIVE MATERIALS, A PROCESS FOR ITS PRODUCTION AND ITS USE

FIELD OF THE INVENTION

The present invention relates to a sintered composite abrasive product based on a $\alpha$-$Al_2O_3$ matrix and at least one mechanically resistant material, to a process for the production of the sintered composite abrasive product and to its use.

BACKGROUND OF THE INVENTION

The composite products have great importance as cutting ceramics by virtue of their great toughness and their chip cutting action. Sintered composite products based on $Al_2O_3$ with mechanically resistant materials embedded therein are the subject matter of DE-A 1 671 095, DE-A 2 471 295 and DE-A 3 529 265. Lee and Kim describe the production of $Al_2O_3$—TiC composite products by pressure-free sintering in J. M. Ceram. Soc., 72 (8), 1333–37 (1989). $Al_2O_3$—SiC composite products are disclosed in EP-A 0 311 289, FR-A 2 349 633 and FR-A 2 430 445.

According to EP-B 0 317 147, An $Al_2O_3$ composite product is obtained by sintering suitable pulverulent starting materials at temperatures of from 1500° C. to 1900° C.

The system $Al_2O_3$—$Al_4C_3$—$AlN$ and the formation of oxycarbides and oxynitrides of aluminum are described in J. Am. Ceram, Soc., 72 (9), 1704–709 (1989).

SiC-whisker-reinforced ceramics are the subject of a publication by Wei and Becher in Am. Ceram. Soc. Bull 64(2)298–304(1985).

$Al_2O_3$—$B_4C$ sintered products are mentioned by K.C. Radford in J. Mater. Sci., 18, No. 3, 669–678/1983.

Materials in which carbonitrides (mixed phases of nitrides and carbides) are, inter alia, also incorporated in the $Al_2O_3$ matrix are the subject matter of U.S. Pat. No. 4,320,203.

In U.S. Pat. No. 4,325,710 materials are described in which the matrix is doped with TiN, Zr and ZrC.

In U.S. Pat. No. 4,204,873, Yamamoto, Sakurai and Tanaka describe ceramic materials whose structure is strengthened by the incorporation of WC or $W_2C$ in combination with other mechanically resistant materials.

In all these described processes, the starting materials are mixed in the form of their powders, the mixture is compressed and the compacted body is sintered at relatively high temperatures. In some cases, pressure and inert gas are also employed. The crystallite size of the $Al_2O_3$ matrix obtained is in no case less than 1 micron.

The grinding performance of the ceramic obtained by this process does not meet the high standards currently demanded of modern abrasives.

Processes for obtaining composite $Al_2O_3$ products via the melt have also been described. Thus intercalation compounds of $Al_4O_4C$ and $Al_2OC$ in an $Al_2O_3$ matrix are obtained by melting and controlled cooling of a mixture of $Al_2O_3$ with a carbon carrier (EP-A 0 022 420, AT-A379 979). A composite product containing oxynitrides as well as oxycarbides is described in FR-A 2 628 414. According to DE-C 152 501, a composite product of $Al_2O_3$ and $B_4C$ was already prepared in 1902 by melting in an electric resistance furnace. DE-B 1 049 290 describes an abrasive based on $Al_2O_3$ with intercalated TiC, also obtained via the melt.

Compared with the sintered products described above, the $Al_2O_3$ matrix in the melt-derived material has a substantially coarser crystalline structure.

The object of the present invention is the realization of abrasives which do not have the described disadvantages of the above-mentioned ceramic materials.

SUMMARY OF THE INVENTION

The object is fulfilled by a sintered composite abrasive product based on an $\alpha$-$Al_2O_3$ matrix and at least one mechanically resistant material, in which the primary crystallite sizes of the $\alpha$-$Al_2O_3$ are in the range of from 0.1 to 1 $\mu$m. The present invention relates to such a sintered composite abrasive product.

Exceptional abrasive technical advantages are obtained due to the submicron structure of the composite abrasive product according to the invention.

In certain grinding processes, small areas break out of the abrasive grain due to the contact pressure. New cutting edges are thereby formed. This self-sharpening mechanism considerably increases the grinding action of the sintered microcrystalline abrasive grain compared with that of conventional molten or sintered abrasive grains.

In a preferred embodiment of this invention, the $\alpha$-$Al_2O_3$ matrix was obtained by the sol-gel process. The mechanically resistant materials are preferably essentially isotropic grains but can be of other dispersed phase forms. Exceptionally good properties were obtained when the chemically resistant materials had grain sizes of from 1 to 70 $\mu$m, preferably from 10 to 50 $\mu$m. The quantity of the chemically resistant materials should preferably be from 1 to 30% by weight, based on the sintered composite abrasive product.

These mechanically resistant materials were preferred according to the invention belong to one or more of the classes of compounds of carbides, silicides, oxides, borides, nitrides or mixed phases of these mechanically resistant materials, such as oxycarbides, oxynitrides, carbonitrides or other combinations, e.g. sialons.

The incorporation of the mechanically resistant materials in the $Al_2O_3$ matrix produces lines of preferential breakage so that the self-sharpening mechanism is also produced in materials whose microcrystalline structure is coarser than the structure of conventional sol-gel corundums. One advantage of the composite abrasive products according to the invention is therefore that sintering additives, crystallisation nuclei or other manipulations are no longer necessary for obtaining the desired self-sharpening mechanism.

A further advantage is that the mechanically resistant material also acts as an abrasive in addition to the $Al_2O_3$ matrix. Since the mechanically resistant materials employed are usually superior to corundum in at least one important abrasive property (e.g. hardness, toughness, thermal conductivity, etc.) and their frequently inadequate thermal or chemical resistance is immaterial due to the structure of the composite product a further improvement in performance is obtained compared with that of simple sol gel corundums.

A composite product whose matrix is built up of $Al_2O_3$ crystallites preferably having a primary crystal size below 0.4 micron may be obtained without the aid of sintering additives and/or crystallisation nuclei. Such a composite abrasive product combines the advantages of sol gel corundums with those of ceramic composite products and of the above-described abrasion grain agglomerates.

The crystallite size in the $Al_2O_3$ matrix may advantageously be kept below 0.2 microns by the additional use of sintering additives and/or crystallisation nuclei.

Particularly preferred mechanically resistant materials for the purpose of this invention are one or more from the group comprising SiC, $TiB_2$, $Al_2O_3$, TiC, AlON, $Si_3N_4$, SiAlON, TiN, $B_4C$, TiCN, WTiC, WC, $Cr_3C_2$, VC, AlN, TaC, NbC, $W_2C$, VMeC and TiMeC, Me being metals of groups 4a, 5a and 6a of the periodic table of the elements, and CrAlC.

When using carbides as preferred mechanically resistant materials according to the invention it was surprisingly found that, even mechanically resistant materials which are coarsely crystalline compared with the required matrix, have a favourable effect on the crystal growth of the $Al_2O_3$ matrix and have excellent action as inhibitors of crystal growth. In many cases the inhibitory action of the carbide-containing mechanically resistant materials is considerably superior to that of $Cr_2O_3$, $TiO_2$, $SiO_2$, MgO, NiO, ZnO, CoO and $Fe_2O_3$ etc. or precursors thereof, which are known from the literature and have frequently been disclosed.

Carbides have not hitherto been disclosed as crystal growth inhibitors or sintering additives for $Al_2O_3$ ceramics.

The best results were obtained using SiC as the mechanically resistant material. This is also the case with WC, TiC can also be equally effective.

Best results are obtained with SiC as mechanically resistant material. The same applies to $TiB_2$. TiC may also be advantageous and AlON is also particularly suitable.

The composite abrasive products according to the invention are enormously versatile since any one of the functional principles of the above mentioned species may be emphasized according to the use purpose of the product simply by varying the grain size of the mechanically resistant material, the quantity and nature of this material and the addition of sintering additives so that an optimum abrasive grain can be developed for many different grinding operations.

Compared with pure mechanically resistant materials, the composite abrasive products according to the invention have the advantage that by virtue of their structure, the grinding effect of the mechanically resistant materials can be made use of without the disadvantages of these materials (brittleness, sensitivity to temperature, lack of chemical resistance, etc.).

Due to the grinding action of the sub-micron $\alpha Al_2O_3$ matrix, the composite abrasive products according to the invention provide advantages in the grinding process compared with conventional cutting ceramics which moreover have the disadvantage that they are very difficult to work up into an abrasive grain.

Although composite abrasive materials produced by the sol gel process are described in DE-A 2 414 047, the object in that case is to render extremely fine abrasive grains capable of being processed, but the matrix, which may consist of $SiO_2$, $Al_2O_3$, $TiO_3$, $ZrO_2$ or mixtures thereof, is microporous and not sintered and does not take part in the grinding process.

In the composite abrasive products according to the invention, on the other hand, the matrix preferably has a density above 98% of the theoretical density and a hardness greater than 19 GPa (HV 200) (Vickers) and actively takes part in the grinding process due to its microcrystalline structure. Another advantage of the composite abrasive products according to the invention is that they can tolerate substantially higher contact pressures. The possible applications and the performance far exceed those of the compounds described in DE-A 2 414 047.

Composite abrasive products based on $Al_2O_3$/AlON prepared by the sol gel process followed by reaction sintering to form AlON are described in U.S. Pat. No. 4,855,264.

The disadvantages of the process are as follows:
high sintering temperatures (1600° C.–2000° C.) leading to a crystal growth to at least 2 $\mu m$
expensive starting materials
elaborate process with many process steps.

Composite ceramic products based on $Al_2O_3$ gel powder containing from 5 to 90% by weight of additives, in particular SiC whiskers, are disclosed in U.S. Pat. No. 4,844,848. Owing to the manufacturing processes employed, however, these composite ceramic products are not micro-crystalline. They therefore do not have the necessary property of readily forming cracks which is necessary for the composite abrasive products according to the invention.

In addition, the process is more complicated and therefore more expensive since an intermediate stage is isolated and an additional process step (compression) is interposed. The advantages of the direct sol gel process important for the production of an abrasive material are therefore partly lost since the drying process to some extent destroys the outstanding sintering activity of the gel, which is attributed to polycondensation reactions in the aqueous sol or gel state.

The present invention also relates to a process for the production of the sintered composite abrasive product according to the invention, in which particles of mechanically resistant material of a specified grain size are added to a conventionally prepared $Al_2O_3$ sol or gel which is then dried, calcined and sintered.

In the process according to the invention, the mechanically resistant material is directly added to the sol or gel, in contrast to the process according to U.S. Pat. No. 4,844,848.

The sol or gel is homogenized, gelled if it is a sol, dried, calcined and sintered.

If the mechanically resistant material used is sensitive to oxidation, a vacuum and/or inert gas should be employed. Mechanically resistant materials which are sensitive to hydrolysis are preferably dispersed in a water-miscible organic solvent (e.g. acetone or alcohols) before being put into the sol gel process.

Partial oxidation is in some cases definitely desired if it results in the formation of oxycarbides or oxynitrides, which are regarded as mechanically resistant materials for the purpose of this invention.

Substances which undergo uncontrolled decomposition or complete oxidation in spite of these precautions and are therefore no longer suitable as mechanically resistant materials for the purpose of this invention must be worked up by complicated processes.

The present invention also relates to the use of the sintered composite abrasive products according to the invention for the production of abrasive materials or grinding tools.

DETAILED DESCRIPTION OF PREFERRED EMBODIMENTS

A preferred embodiment of practice of the invention is illustrated by way of examples below but the invention is not to be regarded as limited by the examples.

EXAMPLE 1

500 g of aluminium oxide monohydrate (Dispersal manufactured by Condea) were dispersed in 2 liters of water with the addition of acid ($HNO_3$). The suspension was centrifuged to remove the portion of starting material which had not been dispersed (about 2%). The suspension was heated to boiling with constant stirring and 14.4 grams of SiC (P600 of Elektroschmelzwerk Kempten) were added. A marked increase in the viscosity of the sol was already noted during the heating up period and a further increase occurred when the mechanically resistant material was added. The gelling process was completed several minutes after all the mechanically resistant material had been added. The gel was dried in a drying cupboard at 65° C. The dried gel was calcined at 600° C. and sintered for 4 hours at 1350° C.

The composite abrasive product may be size reduced to the required grain size before or after sintering.

| | Analysis | | | |
|---|---|---|---|---|
| | | | | Average crystallite size |
| Proportion of mechanically resistant material | Hardness (HV 0.2) | Density | Matrix | Mechanically resistant material |
| 4% SiC | 2230 | 98.5% | less than 1 micron | 25 my |

Abrasive tests

Abrasive use testing was conducted on the Example 1 product relative to the state of art products with superior results for the Example 1 product.

| Fibre disc | |
|---|---|
| Abrasive material (Grain 36) | Number of abraded workpieces |
| Cubitron (sol gel corundum ex 3M Co.) | 85 |
| Norzon (zirconium corundum ex Norton Co.) | 50 |
| Example 1 | 110 |

| Abrasive belt (Grain 36) | |
|---|---|
| Abrasive material | Abrasion against C 45 steel |
| Cubitron | 2873 g |
| Norzon | 2476 g |
| Example 1 | 3385 g |

| Abrasive belt (Grain 60) | |
|---|---|
| Abrasive material | Abrasion against stainless steel |
| Norton SG (R 984) | 1370 g |
| Norzon | 1125 g |
| Example 1 | 1520 g |

| Abrasive disc (Grade 60) | |
|---|---|
| Abrasive material | G-Factor (Quotient of removal of material and loss of abrasive material from disc) |
| Norton SG | 223 g |
| Cubitron | 170 g |
| Example 1 | 251 g |

EXAMPLE 2

Preparation of the composite abrasive product was carried out as in Example 1.

18 grams of $TiB_2$ (Manufacturer Hermann C. Starck) were added instead of SiC.

| | Analysis | | | |
|---|---|---|---|---|
| | | | | Average crystallite size |
| Proportion of mechanically resistant | Hardness (HV 0.2) | Density | Matrix | Mechanically resistable material |
| 5% SiC | 2070 | 97.2% | <1 my | 30 my |

| Abrasive test Abrasive disc (Grain 36) | |
|---|---|
| Abrasive material | G-Factor |
| Norton SG | 237 g |
| Cubitron | 194 g |
| Example 2 | 270 g |

EXAMPLE 3

Same as Example 1, but 18 grams of TiCN were added as mechanically resistant material instead of SiC.

The product was calcined at 600° C. in an atmosphere of $N_2$ and then sintered under helium at 1350° C.

| | Analysis | | | |
|---|---|---|---|---|
| | | | | Average crystallite size |
| Proportion of mechanically resistant material | Hardness (HV 0.2) | Density | Matrix | Mechanically resistant material |
| 5% TiCN | 2264 | 98.9% | <1 my | 30 my |

| Abrasive test Abrasive disc (Grain 36) | |
|---|---|
| Abrasive material | G Factor |
| Cubitron | 183 g |
| Norton SG | 215 g |
| Example 3 | 287 g |

EXAMPLE 4

Same as Example 3. 18 grams of TiC (Manufacturer Hermann C. Starck) were added instead of TiCN.

| Proportion of mechanically resistant material | Analysis | | Average crystallite size | |
|---|---|---|---|---|
| | Hardness (HV 0.2) | Density | Matrix | Mechanically resistant material |
| 5% TiC | 1894 | 96.5% | <1 my | 30 my |

| Abrasive test Abrasive disc (Grain 36) | |
|---|---|
| Abrasive material | G Factor |
| Cubitron | 194 g |
| Norton SG | 254 g |
| Example 4 | 271 g |

EXAMPLE 5

Same as Example 3. 36 grams of TiCN were added.

| Proportion of mechanically resistant material | Analysis | | Average crystallite size | |
|---|---|---|---|---|
| | Hardness (HV 0.2) | Density | Matrix | Mechanically resistant material |
| 10% TiC | 2154 | 98.7% | <1 my | 10 my |

| Abrasive Test Abrasive disc (Grain 36) | |
|---|---|
| Abrasive material | G Factor |
| Cubitron | 187 g |
| Norton SG | 224 g |
| Example 5 | 315 g |

EXAMPLE 6

Same as Example 3 36 grams of WC were added.

| Proportion of mechanically resistant material | Analysis | | Average crystallite size | |
|---|---|---|---|---|
| | Hardness (HV 0.2) | Density | Matrix | Mechanically resistant material |
| 10% WC | 2346 | 98.5% | <1 my | 30 my |

| Abrasive Test Abrasive disc (Grain 36) | |
|---|---|
| Abrasive material | G factor |
| Cubitron | 202 g |
| Norton SG | 252 g |
| Example 5 | 327 g |

We claim:

1. Sintered composite abrasive product based on an alpha $Al_2O_3$ matrix and at least one mechanically resistant material selected from the class of compounds consisting of carbides, silicides, oxides, borides, nitrides and mix phases of these mechanically resistant materials, namely oxycarbides, oxynitrides, carbonitrides or other combinations thereof, wherein said mechanically resistant material is composed of isometric grains with grain sizes from about 1 μm to about 70 μm, and wherein said composite abrasive product is characterized in that the primary crystalline size of the alpha $Al_2O_3$ is in the range of from about 0.1 to about 1.0 μm, and where said alpha $Al_2O_3$ matrix is obtained by the sol gel process.

2. Sintered composite abrasive product according to claim 1, wherein said grain size range is from 10 to 50 μm.

3. Sintered composite abrasive product according to claim 1, wherein the quantity of the mechanically resistant materials is from 1 to 30% by weight, based on the sintered composite abrasive product.

4. Sintered composite abrasive product according to claim 1, wherein the mechanically resistant material is from the carbide series.

5. Sintered composite abrasive product according to claim 4, wherein the mechanically resistant material is SiC.

6. Sintered composite abrasive product according to claim 1, wherein the mechanically resistant material is $TiB_2$.

7. Sintered composite abrasive product according to claim 4, wherein the mechanically resistant material is TiC.

8. Sintered composite abrasive product according to claim 1, wherein the mechanically resistant material is AlON.

9. A process for the production of sintered composite abrasive products comprising the step of sintering dispersed mechanically resistant particles selected from the class of compounds consisting of carbides, silicides, oxides, borides, nitrides and mix phases of these mechanically resistant materials, namely, oxycarbides, oxynitrides, carbonitrides or other combinations thereof, of isometric grains from about 1 micron to about 70 microns is size, together with matrix material selected from the class consisting of $Al_2O_3$ sols and $Al_2O_3$ gels.

10. Abrasive material comprising a sintered composite of $Al_2O_3$ of about 0.1 to 1 micrometers crystallite size with a dispersed phase of mechanically resistant material selected from the class of compounds consisting of carbides, silicides, oxides, borides, nitrides and mix phases of these mechanically resistant materials, namely, oxycarbides, oxynitrides, carbonitrides or other combinations thereof, of isometric grains from about 1 micron to about 70 microns in size, therein.

11. Grinding tool comprising a sintered composite of $Al_2O_3$ of about 0.1 to 1 micrometer crystallite size with a dispersed phase of mechanically resistant material selected from the class of compounds consisting of carbides, silicides, oxides, borides, nitrides and mix phases of these mechanically resistant materials, namely, oxycarbides, oxynitrides, carbonitrides or other combinations thereof of isometric grains from about 1 micron to about 70 microns in size, therein.

* * * * *